US012155116B2

(12) United States Patent
Lewin et al.

(10) Patent No.: US 12,155,116 B2
(45) Date of Patent: Nov. 26, 2024

(54) WAVE GUIDE FOR AN ARRAY ANTENNA

(71) Applicant: JAGUAR LAND ROVER LIMITED, Coventry (GB)

(72) Inventors: Andrew Lewin, Coventry (GB); Runxiao Ding, Coventry (GB)

(73) Assignee: JAGUAR LAND ROVER LIMITED, Coventry (GB)

( * ) Notice: Subject to any disclaimer, the term of this patent is extended or adjusted under 35 U.S.C. 154(b) by 187 days.

(21) Appl. No.: 17/999,379

(22) PCT Filed: May 20, 2021

(86) PCT No.: PCT/EP2021/063486
§ 371 (c)(1),
(2) Date: Nov. 18, 2022

(87) PCT Pub. No.: WO2021/234098
PCT Pub. Date: Nov. 25, 2021

(65) Prior Publication Data
US 2023/0198133 A1 Jun. 22, 2023

(30) Foreign Application Priority Data
May 20, 2020 (GB) ...................................... 2007503

(51) Int. Cl.
*H01Q 1/32* (2006.01)
*H01Q 3/34* (2006.01)
*H01Q 21/12* (2006.01)

(52) U.S. Cl.
CPC ............. *H01Q 1/3233* (2013.01); *H01Q 3/34* (2013.01); *H01Q 21/12* (2013.01)

(58) Field of Classification Search
CPC ......... H01Q 1/3233; H01Q 3/34; H01Q 21/12; H01Q 1/3283; H01Q 3/30; H01Q 13/06; H01Q 21/08
See application file for complete search history.

(56) References Cited

U.S. PATENT DOCUMENTS 10,082,570 B1 * 9/2018 Izadian .................. H01Q 13/06
11,201,414 B2 * 12/2021 Doyle .................. H01Q 1/1221
(Continued)

FOREIGN PATENT DOCUMENTS

DE 102007035429 A1 1/2009
DE 102016007386 A1 12/2016
(Continued)

OTHER PUBLICATIONS

Great Britain Intellectual Property Office, Combined Search and Examination Report under Sections 17 and 18(3) Issued in Application No. GB2007503.2, Oct. 26, 2020, 6 pages.
(Continued)

*Primary Examiner* — Seung H Lee
(74) *Attorney, Agent, or Firm* — McCoy Russell LLP

(57) ABSTRACT

A wave guide for an array antenna, can include: a mounting portion configured to receive a plurality of radar antennas of the array antenna, the mounting portion comprising a respective receiving position for each radar antenna of the array antenna; a set of elongate members spaced from the mounting portion, each elongate member including a series of apertures arranged along the elongate member, wherein each elongate member extends orthogonally to an adjacent elongate member of the set; and a plurality of guide channels, each guide channel extending between a respective one or more receiving positions of the mounting portion and a respective one or more apertures of the elongate members to connect, in use, one or more of the radar antennas to one or more of the apertures.

20 Claims, 7 Drawing Sheets

(56) References Cited

U.S. PATENT DOCUMENTS

| | | | | |
|---|---|---|---|---|
| 11,616,291 | B1 * | 3/2023 | Izadian .................. | H01Q 21/20 343/702 |
| 2006/0164315 | A1 * | 7/2006 | Munk .................. | H01Q 21/064 343/772 |
| 2010/0141527 | A1 | 6/2010 | Lalezari | |
| 2017/0047649 | A1 | 2/2017 | Himmelstoss | |
| 2019/0377061 | A1 * | 12/2019 | Kobayashi ........... | H01Q 1/3233 |
| 2020/0200866 | A1 | 6/2020 | Lynch et al. | |

FOREIGN PATENT DOCUMENTS

| | | | |
|---|---|---|---|
| GB | 1382018 | A | 1/1975 |
| GB | 2416081 | A | 1/2006 |
| WO | 2012100885 | A1 | 8/2012 |

OTHER PUBLICATIONS

ISA European Patent Office, International Search Report and Written Opinion Issued in Application No. PCT/EP2021/063486, Jul. 30, 2021, WIPO, 10 pages.

* cited by examiner

3/7

WAVE GUIDE FOR AN ARRAY ANTENNA

CROSS REFERENCE TO RELATED APPLICATIONS

The present application is a U.S. National Phase of International Application No. PCT/EP2021/063486 entitled "WAVE GUIDE FOR AN ARRAY ANTENNA," and filed on May 20, 2021. International Application No. PCT/EP2021/063486 claims priority to Great Britain Patent Application No. 2007503.2 filed on May 20, 2020. The entire contents of each of the above-listed applications are hereby incorporated by reference for all purposes.

TECHNICAL FIELD

The present disclosure relates to a wave guide for an array antenna. Aspects of the invention relate to a wave guide for an array antenna, to an array antenna, and to a vehicle.

BACKGROUND

Array antennas known for automobiles typically feature a rectangular array of radar antennas arranged into horizontal and vertical rows on a rectangular array face. In such examples, the array face is a surface upon which, or within which, the array of antennas are supported.

Such array antennas are typically mounted on front and/or rear surfaces of a vehicle to monitor traffic ahead of and/or behind the vehicle. However, the rectangular array face can cause packaging problems. For example, if an array antenna is mounted on the front grille of a vehicle, the array face may obstruct airflow through the grille and so compromise cooling.

In view of these problems, relatively small array antennas are conventionally used that minimise the obstruction to the airflow. However, the angular resolution and field of view of the array antenna are dictated by the arrangement of its individual radar antennas. In particular, the number of antennas in the array and the spacing between adjacent antennas must adhere to physical diffraction limits. As a result, the capabilities of the array antenna are limited by the dimensions of the array face and the space available for arranging antennas thereon. Such limitations make it difficult to determine which lane of traffic a distant vehicle is driving in when multiple objects are travelling with the same speed in the same direction.

It is an aim of the present invention to address one or more of the disadvantages associated with the prior art.

SUMMARY OF THE INVENTION

Aspects and embodiments of the invention provide a wave guide for an array antenna, an array antenna, and a vehicle as claimed in the appended claims.

According to an aspect of the present invention there is provided a wave guide for an array antenna, the wave guide comprising: a mounting portion configured to receive (or interface with) a plurality of radar antennas of the array antenna, the mounting portion comprising a respective receiving position for each radar antenna of the array antenna (for example, a receiving position in which said radar antenna is received and with which said radar antenna is aligned); a set of elongate members spaced from the mounting portion, each elongate member including a series of apertures arranged along the elongate member, wherein each elongate member extends orthogonally to an adjacent elongate member of the set; and a plurality of guide channels, each guide channel extending between a respective one or more receiving positions of the mounting portion and a respective one or more apertures of the elongate members to connect, in use, one or more of the radar antennas to one or more of the apertures.

Advantageously, the wave guide provides an array of apertures arranged on thin elongate members that have a relatively long and thin footprint on the exterior of a vehicle. Additionally, the elongate members extend orthogonally to one another for two dimensional operation, such that they can emulate the functionality of a conventional large rectangular antenna array whilst framing, or otherwise minimally obstructing, a body component of the vehicle. Packaging is therefore easier, as there is an increase in possible locations on the vehicle where the antennas can be fitted and each elongate member can be made much longer than the typical height or width of a conventional rectangular array antenna.

The substantial length of each elongate member can accommodate a large number of apertures arranged in series along the length of the elongate member and antenna signals can be transmitted or received through each aperture. Collectively, the length of the series of apertures allows for a correspondingly wide beam of antenna signals, in turn offering a relatively large field-of-view even when the beam is narrowed to its minimum to maximise resolution. As a result, software defined phase delays can be used to transmit a 'virtual' beam of antenna signals with a wide field of view and sufficient angular resolution to determine which lane of traffic a distant vehicle is driving in.

Suitably, each guide channel is configured to guide, in use, an antenna signal between one or more of the receiving positions and one or more of the apertures. The transmission loss for each antenna signal may be relatively small, for example 4 to 5 db less than the transmission loss in a traditional transmission line to a patch antenna.

Optionally, the width of each elongate member of the set of elongate members is less than 5 cm. Optionally, the width of each elongate member of the set of elongate members is less than 2.5 cm.

Optionally, each aperture of the series of apertures comprises a cluster of slots. Optionally, the cluster of slots forming each aperture is markedly spaced from the cluster of slots of an adjacent aperture in the series of apertures. Optionally, the spacing between the cluster of slots forming a first aperture of the series of apertures and the cluster of slots forming an adjacent second aperture of the series of apertures is greater than a span of the first aperture.

Optionally, each of the plurality of guide channels extends through the same length between said respective receiving position and said respective aperture. Advantageously, thermal drift of phase relationships can be minimised when the plurality of guide channels all have the same length.

Optionally, at least some of the elongate members of the set of elongate members are integral with one another.

Optionally, the set of elongate members form an array body having an array face. The array face of the wave guide may, for example be formed from or include a reflective material, such as a suitable metal. Optionally, respective surfaces of the elongate members in which the apertures are arranged collectively define the array face. Optionally, the array face is planar.

Optionally, the set of elongate members includes a parallel pair of elongate members spaced apart from one another so that the array face includes a cavity between the parallel pair of elongate members. The cavity may be a closed cavity bounded by the set of elongate members or a partially open cavity, for example a cavity that is not completely bounded by the set of elongate members.

Optionally the cavity spans a length of at least 5 cm. Optionally each elongate member has a minimum length of at least 10 cmcm. Optionally, the series of apertures on each elongate member includes a minimum of 8 apertures.

Optionally, the array face defined by the set of elongate members has one of: an L-shape; a T-shape; an I-shape; or a cross-shape. For embodiments that include parallel elongate members, the array face may have a U-Shape or a rectangular or box-shape.

Optionally, the set of elongate members are arranged on a first plane and the wave guide has a length extending from the first plane to a second plane in which the mounting portion is arranged. Optionally, the wave guide defines a continuous section or body along the length of the wave guide between the first and second planes, the profile of the continuous section being defined by the array face. Optionally, the wave guide has a uniform profile along the length of the wave guide between the first and second planes.

Optionally, the second plane is parallel to the first plane. Alternatively, the second plane may be inclined relative to the first plane and/or the array face.

Optionally, the wave guide includes a plurality of layers, the mounting portion forming a first layer of the wave guide, the set of elongate elements forming a second layer of the wave guide and the plurality of guide channels forming a third layer of the wave guide, the third layer being arranged between the first and second layers.

The third layer may comprise a plurality of sub-layers that join together to form the plurality of guide channels, each guide channel including a respective opening or slot in each of the plurality of sub-layers and each guide channel being formed by a collective series of the respective openings that extends through the plurality of sub-layers.

Optionally, the wave guide includes a housing for the mounting portion, the set of elongate elements and the plurality of guide channels.

Optionally, the wave guide includes a coupling element that is configured for attaching the wave guide to a vehicle. The coupling element may substantially inhibit relative movement between the wave guide and the vehicle.

According to another aspect of the invention there is provided an array antenna for a vehicle. The array antenna comprises the wave guide of the above aspect of the invention, and a plurality of radar antennas. The plurality of radar antennas are received on the mounting portion of the wave guide such that each radar antenna is received in a respective receiving position on the mounting portion of the wave guide.

Optionally, the plurality of guide channels includes a first set of guide channels and a second set of guide channels, and the plurality of radar antennas includes a first set of antennas and a second set of antennas. In such embodiments, each guide channel in the first set of guide channels connects one or more antennas from the first set of antennas to one or more apertures of a first elongate member of the set of elongate members, and each guide channel in the second set of guide channels connects one or more antennas from the second set of antennas to one or more apertures of a second elongate member of the set of elongate members. The first elongate member is orthogonal to the second elongate member.

Optionally, the first set of antennas includes two or more transmitters and the second set of antennas includes two or more receivers.

Optionally, the first set of antennas includes a first set of transceivers and the second set of antennas includes a second set of transceivers.

Optionally, each guide channel in the first set of guide channels extends through the same length between said respective receiving position and said respective aperture. Optionally, each guide channel in the second set of guide channels extends through the same length between said respective receiving position and said respective aperture.

Optionally, the series of apertures on each elongate member are unequally spaced.

Optionally, the series of apertures on each elongate member are spaced so that, in use, the outermost sidelobes of a beam of antenna signals, formed by the collection of antenna signals transmitted from the series of apertures, have negligible amplitude.

Optionally, the series of apertures on each elongate member are spaced so that, in use, the first sidelobe of the beam of antenna signals transmitted from the series of apertures, which is significant (i.e. not negligible), is outside of the field of view of the radar antenna. In other words, the field of view of the radar antenna may substantially correspond to the main lobe of the beam of antenna signals, encompassing the main lobe partially or in its entirety.

Optionally, the array antenna includes a control system comprising one or more controllers, the control system being configured to operate the plurality of radar antennas as at least one of: a phased array antenna; and/or a virtual array of radar antennas, optionally, using a multi-input-multi-output principle.

Optionally, the control system is configured to operate the plurality of radar antennas to produce at least one of: a phase-modulated continuous waveform; and/or a frequency-modulated continuous waveform.

Optionally, at any given moment, the control system is configured to operate one of the first and second sets of antennas as transmitters and the other of the first and second sets of antennas as receivers.

Optionally, the control system comprises one or more controllers configured to operate the transmitters to output one or more antenna signals, and to operate the receivers to receive one or more of the antenna signals that reflect or scatter off an object.

Optionally, one or more of the controllers may further include an electronic processor having an electrical input for receiving antenna signals and an electrical output for outputting antenna signals. The controller may also include an electronic memory device electrically coupled to the electronic processor and having instructions stored therein, the processor being configured to access the memory device and to execute the instructions stored therein to process received antenna signals and/or to generate antenna signals for transmission.

Optionally, the array antenna includes a single-chip radar sensor comprising the plurality of radar antennas. The single-chip radar sensor may also comprise at least part of the control system, and optionally the entire control system.

According to another aspect there is provided a vehicle comprising the wave guide and/or the array antenna of the above aspects. Optionally, the wave guide is attached to the vehicle so that the set of elongate elements of the wave guide border a body component of the vehicle. Optionally, the array face of the wave guide is flush with a surface of the body component. Optionally, the wave guide and/or the array antenna is attached to a frontal area of the vehicle. Optionally, the wave guide and/or the array antenna is attached to the vehicle around at least one of: a grille; a windscreen; first and second wing mirrors; a bonnet that may, for example, include a hood scoop, spoiler or other aerodynamic device; a front bumper and first and second vehicle headlights. The airflow to, or around, each of these body components may, for example, be configured to provide some cooling, aerodynamic or other benefit to the vehicle such that it would be undesirable to disturb the airflow to said body component.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which.

DETAILED DESCRIPTION

Figure 1:
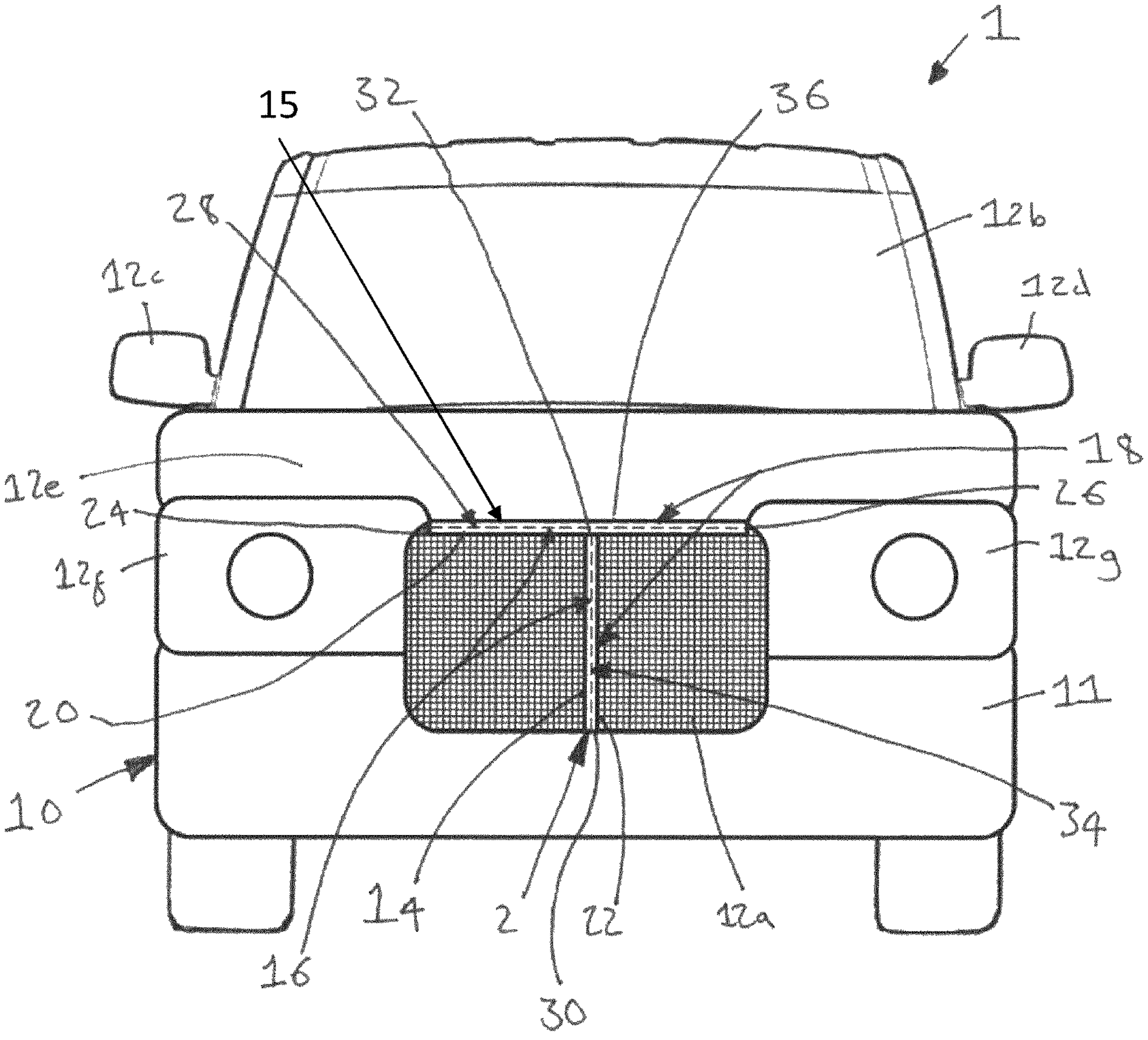
FIG. 1 shows a schematic representation of a vehicle including an array antenna in accordance with an embodiment of the present invention.

Embodiments of the invention relate to vehicles having array antennas, and in particular to wave guides for such array antennas.

In general terms, wave guides of this disclosure are configured to direct antenna signals between a plurality of antennas and an array of apertures on an array face of the wave guide, the array face forming an exterior surface of the vehicle in use. The array of apertures is therefore arranged on the exterior of the vehicle to transmit and receive antenna signals indicative of objects in the vicinity of the vehicle.

The wave guides of this disclosure make advantageous use of the fact that antenna signals transmitted from a first row of apertures and received, following reflection from a distant object, at an orthogonal second row of apertures, can be processed, for example using a multi-input-multi-output principle, to provide object detection capabilities that are comparable to a conventional array antenna having a larger number of antennas arranged in a rectangular array. So, relative to a conventional rectangular array, the wave guides of this disclosure enable an improvement in performance without increasing the overall footprint of the array face.

In particular, the wave guides of this disclosure include a set of thin, elongate members that may collectively form an array body that defines the array face. Each elongate member extends orthogonally to an adjacent elongate member and includes a series, or row, of apertures arranged along its length that can be used to transmit or receive antenna signals.

By virtue of their elongate profile, the elongate members minimally obstruct airflow to, through, or around, the surrounding surfaces of the vehicle and each elongate member may be much longer than the width or height of a conventional rectangular array face.

Consequently, each elongate member can include a large number of apertures arranged along its length and the length of this series can provide a wide field of view and sufficient angular resolution to determine, for example, which lane of traffic a distant vehicle is travelling in, particularly, when multiple vehicles are travelling at substantially the same speed.

Hence, relative to a conventional rectangular array antenna, the array antenna of this disclosure provides enhanced angular resolution and/or field of view for a given footprint or surface area. Accordingly, in a grille-mounted context the array antenna of this disclosure offers improved performance without adding any further obstruction to airflow, for example.

A vehicle 1 featuring an array antenna 2 and a waveguide 4 for the array antenna 2 in accordance with an embodiment of the present invention is described herein with reference to the accompanying FIGS. 1 to 6. A second embodiment is described with reference to FIGS. 7 and 8.

For the purposes of the following description it will be appreciated that references to the front and the rear of the vehicle 1 are intended to be references to the respective ends of the vehicle 1; that references to the top and bottom of the vehicle 1 relate to the roof and floor of the vehicle 1; and that references to the sides of the vehicle 1 refer to left or right sides of the vehicle 1 extending between the front and rear ends of the vehicle 1. However, such definitions are not intended to be limiting.

FIG. 1 shows the vehicle 1 from a front view. A frontal area 10 of the vehicle 1 is defined by the exterior surfaces 11 of the vehicle 1 that are visible when the vehicle 1 is viewed from the front. The frontal area 10 is shown to feature various body components 12, including: a grille 12*a*; a windscreen 12*b*; first and second wing mirrors 12*c*, 12*d*; a bonnet 12*e* that may, for example, include a hood scoop, spoiler or other aerodynamic device; a front bumper 12*f* and first and second vehicle headlights 12*g*. 12*h*. The airflow to, or around, each of these body components 12*a-h* may, for example, be configured to provide some cooling, aerodynamic or other benefit to the vehicle 1 such that it would be undesirable to disturb the airflow to each body component 12*a-h*.

In this example, the array antenna 2 is mounted on the frontal area 10 of the vehicle 1 and, in particular, to the front grille 12*a* of the vehicle 1. Accordingly, an array face 14 of the array antenna 2, upon which an array of apertures 16 are arranged, forms a visible surface on the frontal area 10 of the vehicle 1.

The array face 14 of the array antenna 2 is T-shaped, in this example, and is formed on an array body 15 comprising a set of elongate members 18 that includes a first elongate member 20 and a second elongate member 22, which is orthogonal to the first elongate member 20. The first elongate member 20 extends from a first end 24 to a second end 26 and includes a first row of apertures 28 arranged in series between the first and second ends 24, 26. The second elongate member 22 extends from a first end 30 to a second end 32 and includes a second row of apertures 34 arranged in series between the first and second ends 30, 32. Accordingly, the first row of apertures 28 extends orthogonally to the second row of apertures 34.

The array face 14 has a width that extends from the first end 24 of the first elongate member 20 to the second end 26 of the first elongate member 20 and a height that extends from the first end 30 of the second elongate member 22 to a first side 36 of the first elongate member 20.

The width of the array face 14 may be comparable to a width of the grille 12*a* and may even be substantially equal to the width of the grille 12*a*. For example, in FIG. 1, the first elongate member 20 is shown extending horizontally across the frontal area 10 of the vehicle 1 between the first and second headlights 12*g*. 12*h* and adjacent to the bonnet 12*e*. In this manner, the first elongate member 20 may have a minimum length of 10 cm. Furthermore, the height of the array face 14 may be substantially equal to the height of the grille 12*a*, with the second elongate member 22 extending vertically through a centre of the grille 12*a* between the bonnet 12*e* and the front bumper 12*f*. In this manner, the second elongate member 22 may have a minimum length of 10 cm. The height and width of the array face 14 may therefore be substantially equal to the height and width of the grille 12*a*, but the portion of the grille 12*a* covered by the array face 14—and therefore the obstruction to airflow into the grille 12*a* caused by the array face 14-is minimal.

As shall become clear in the description that follows, the height and width of the array face 14 can therefore be made much larger than a conventional rectangular array antenna having the same surface area. Advantageously, enhanced performance is possible with the array antenna 2, compared with a conventional rectangular arrangement, as the height and width of the array antenna 2 principally determine its angular resolution and field of view.

Although the array face 14 is T-shaped in this example, it should be appreciated that various other shapes are possible and, in general, the shape and size of the array face 14 may correspond to the vehicle and, in particular, to the body component of the vehicle upon which the array antenna 2 is mounted. For a given array face shape and size, the number, size and spacing of the apertures arranged on each elongate member may be determined so as to maximise the field of view, whilst maintaining an azimuth angular resolution of at least 1 degree, for example.

In examples of the invention, an azimuth angular resolution of 0.5 degree may be achieved with a field of view of 30 degrees, which is suitable to determine the lane of traffic that a vehicle, or obstacle, is located in at a distance greater than 300m.

Figure 2:
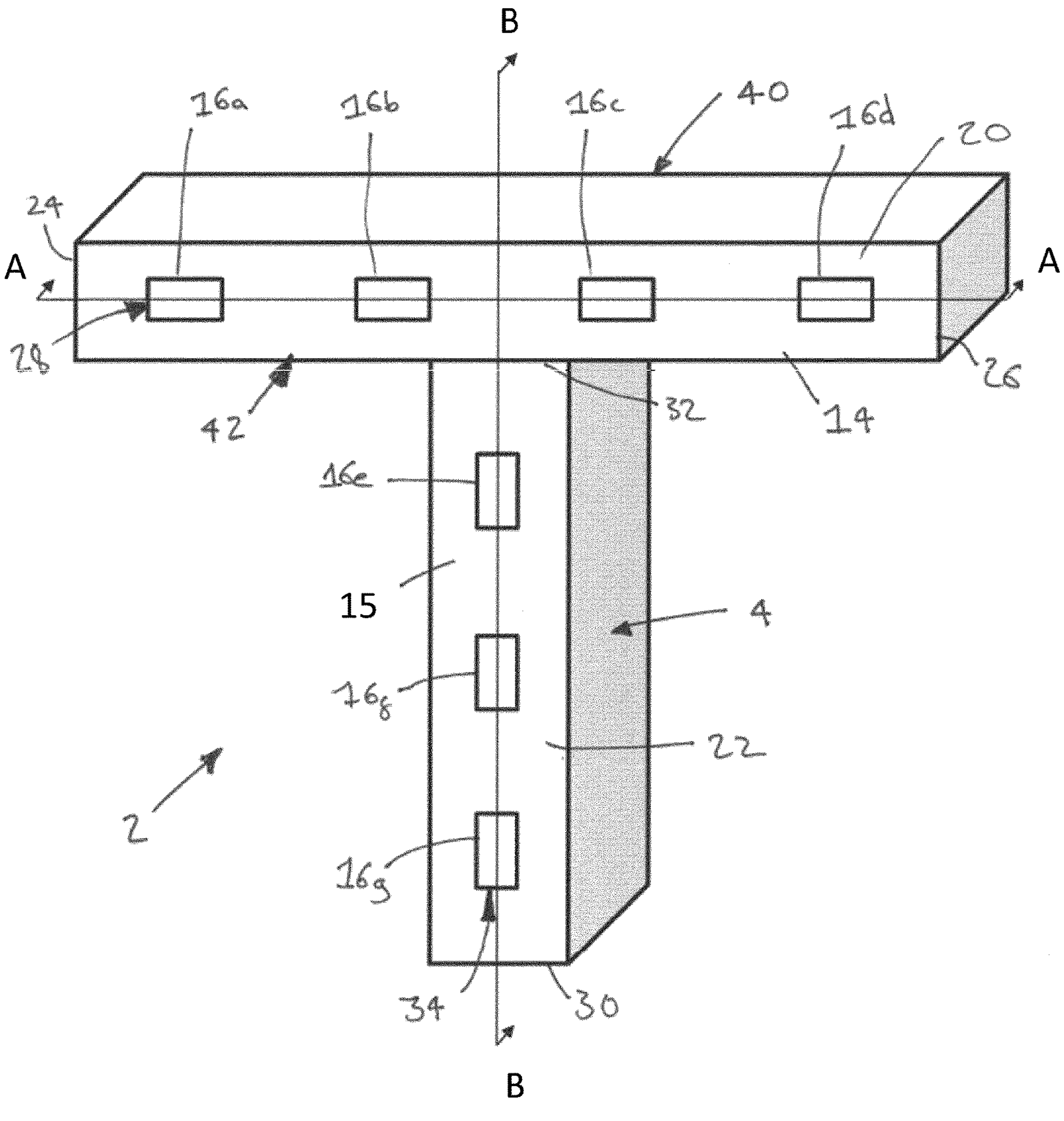
FIG. 2 shows a perspective view of a schematic representation of the array antenna shown in FIG. 1.
Figure 3:
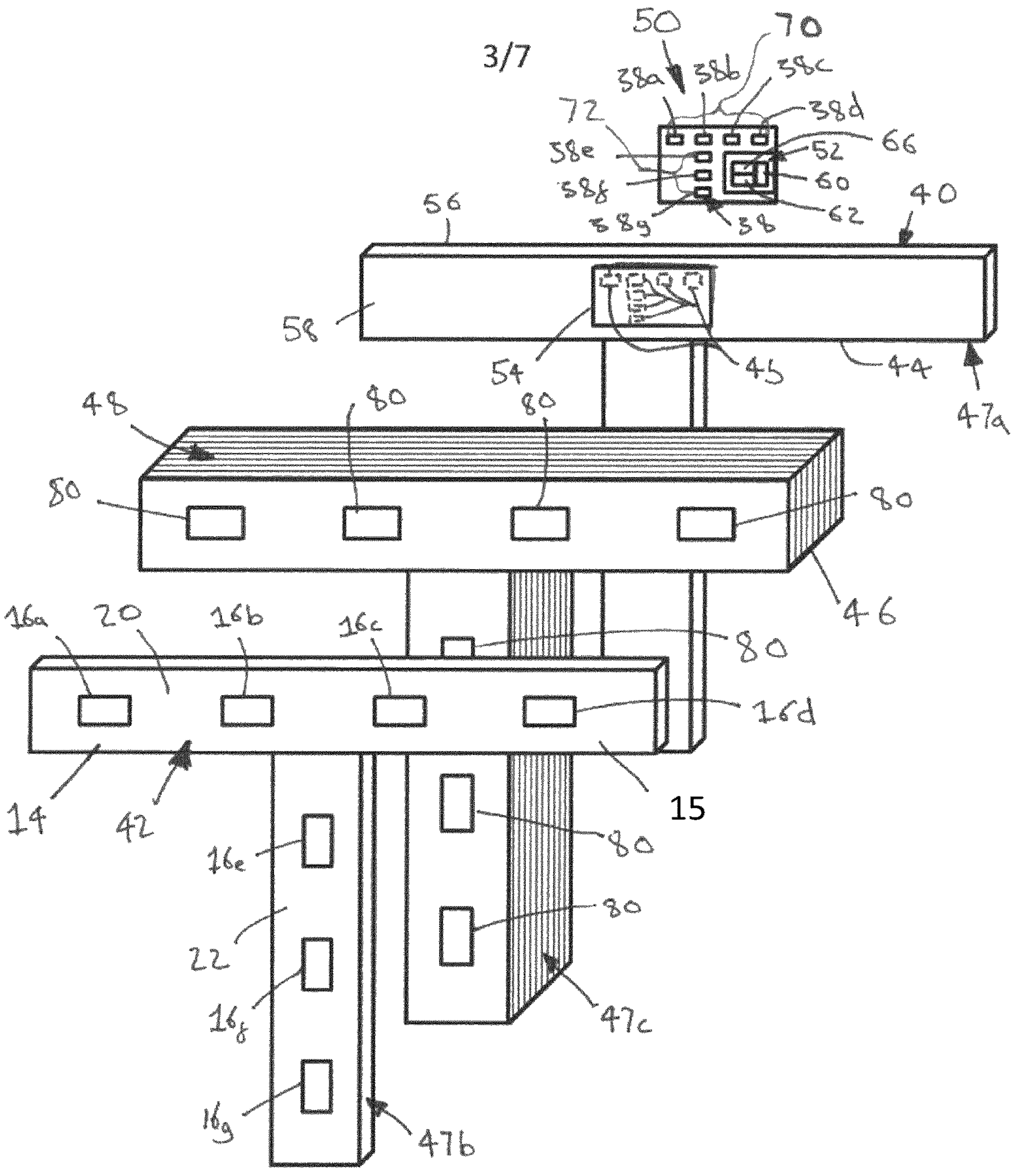
FIG. 3 shows an exploded assembly view of the array antenna shown in FIG. 2.

FIGS. 2 and 3 show the array antenna 2 in more detail, with FIG. 3 showing the array antenna 2 in an exploded assembly view. As shown, the array antenna 2 includes a plurality of antennas 38 (visible in FIG. 3), such as a plurality of radar antennas, and a wave guide 4.

The wave guide 4 is arranged to connect the plurality of antennas 38 to the array of apertures 16 and thereby allows for greater flexibility in the packaging of the plurality of antennas 38.

For this purpose, the wave guide 4 may be formed from, or otherwise include, any material that is suitable for conveying antenna signals between the plurality of antennas 38 and the array of apertures 16 with minimal transmission losses, including plastic or metallised plastic, for example.

In the embodiment shown in FIG. 3 the wave guide 4 is formed from an assembly of parts, although it is also possible to form the wave guide as a single integral part, for example using a fused deposition modelling process.

The wave guide 4 extends between a distal first end 40 and a proximal second end 42 to define a length of the wave guide 4. The wave guide 4 includes: a mount 44 at the rear or first end 40 of the wave guide 4; the array body 15 that includes the array face 14, mentioned previously, at the front or second end 42 of the wave guide 4; and a guide channel portion 46 extending between the mount 44 and the array body 15.

Each of the mount 44, the guide channel portion 46 and the array body 15 form a respective layer 47*a-c* along the length of the wave guide 4, as shown in FIG. 3. These layers are defined by separate bodies in the present embodiment, although a wave guide formed as a single piece may also be considered to be layered in a corresponding manner.

As illustrated, the mount 44 forms a first layer 47*a* of the wave guide 4, the array body 15 forms a second layer 47*b* of the wave guide 4, parallel to the first layer 47*a*, and the guide channel portion 46 forms a third layer 47*c* of the wave guide 4 arranged between the first and second layers 47*a*.b. In this example, the third layer 47*c* is composed of a plurality of sub-layers 48*a-f* that join together to form the guide channel portion 46, as shall be described in more detail in relation to FIGS. 4 and 5.

Each of the first, second and third layers 47*a-c* has a matching T-shaped profile such that collectively the mount 44, the guide channel portion 46 and the array body 15 define a continuous section, or body, along the length of the wave guide 4. The continuous section has a uniform profile between the first and second ends 40, 42, which ensures that the guide channel portion 46 and the mount 44 do not obstruct the air flow through the grille 12*a* any more than the array face 14. It will be appreciated that the grille 12*a* may be mesh like to permit air flow through the grille. In other embodiments the grille 12*a* may comprise a surface arranged to guide air flow. In those embodiments the continuous section has a uniform profile between the first and second ends 40, 42, which ensures that the guide channel portion 46 and the mount 44 do not obstruct the air flow guided by the grille 12*a* any more than the array face 14.

In embodiments, the first and third layers 70*a*.c. i.e. the mount 44 and the guide channel portion 46, may have a different shape and/or orientation to the second layer 70*b*, i.e. the array body 15. In an example, the first and third layers 70*a*.c may take a shape fitting within boundaries defined by the edges of the array face 14, when viewed from the second end 42 of the wave guide 4. This may ensure that the first and third layers do not obstruct the airflow more than the array face 14.

Considered in more detail, the mount 44 provides a mounting portion configured to receive and, in this example, mount the plurality of antennas 38 so that each antenna 38 is aligned with a respective receiving position 45 (indicated by dashed lines in FIG. 3) on the mount 44. In this example, the plurality of antennas 38 are arranged on a single-chip radar 50 that includes a control system 52 for operating first, second, third, fourth, fifth, sixth and seventh radar antennas 38*a-g* that collectively form the plurality of antennas 38.

This example is simplified to avoid obscuring the invention and it should be appreciated that, in other examples, the array antenna 2 may include any number of antennas 38, which may, for example, correspond to the number of apertures 16 arranged on the array face 14, as described in more detail in the description that follows.

The mount 44, in this example, includes a recess 54 for receiving the single-chip radar 50 and retaining means (not shown), such as a clip or clasp, for securing the single-chip radar 50 in position on the mount 44. The recess 54 extends from a distal first surface 56 of the mount 44 to a proximal second surface 58 of the mount 44. Accordingly, the recess 54 is on the rear of the mount 44 as viewed in FIG. 3, which allows for the insertion of the single chip radar 50 through the rear of the wave guide 4. Consequently, once mounted, the plurality of antennas 38*a-g* on the single-chip radar 50 are arranged on a surface 58 of the mount 44 that faces the guide channel portion 46.

The control system 52 of the single-chip radar 50 includes a controller 60 for operating the plurality of antennas 38 as a phased array antenna 2. In particular, the controller 60 may further include an electronic processor 62 having an electrical input for receiving antenna signals and an electrical output for outputting antenna signals. The controller 60 may also include an electronic memory device 66 electrically coupled to the electronic processor 62 and having instructions stored therein, so that the processor 62 is configured to access the memory device 66 and to execute the instructions stored therein to process received antenna signals and/or to generate antenna signals for transmission.

The plurality of antennas 38 includes a first set of antennas 70 and a second set of antennas 72. In this example, the first set of antennas 70 is formed by the collection of the first, second, third and fourth radar antennas 38*a-d* and the second set of antennas 72 is formed by the collection of the fifth, sixth and seventh radar antennas 38*e-g*. At any given moment in time, the control system 52 is configured to operate one of the first and second sets of antennas 70, 72 as transmitters and the other of the first and second sets of antennas 70, 72 as receivers. However, in other examples, the first set of antennas 70 may be a dedicated set of transmitters and the second set of antennas 72 may be a dedicated set of receivers, or vice versa.

The array face 14 forms a visible surface on the exterior of the vehicle 1 that is formed from the outwardly-facing surfaces of the array body 15 and, in particular, the collective outwardly-facing surfaces of the first and second elongate members 20, 22 on which the array of apertures 16 are arranged.

In this example, the first and second elongate members 20, 22 are formed integrally with one another and define a single array face 14. In other examples, the array body may be formed by one or more separately formed elongate members that may be joined together or otherwise connected by the mount and guide channel portion of the wave guide. In this manner, the array face of the array body may provide a single continuous surface, as in this example, or a collection of surfaces spaced apart from one another.

Once the array antenna 2 has been mounted to the vehicle 1, the array face 14 may be flush, or substantially flush with the surrounding exterior surfaces 11 of the vehicle 1.

As shown, in this example, the array of apertures 16 are arranged into: i) the first row of apertures 28, which are arranged along the length, or at least a portion of the length, of the first elongate member 20 (between the first and second ends 24, 26); and ii) the second row of apertures 34, which are orthogonal to the first row of apertures 28 and arranged along the length, or at least a portion of the length, of the second elongate member 22 (between the first and second ends 30, 32).

The first row of apertures 28 includes first, second third and fourth apertures 16*a-d* and the second row of apertures 34 includes fifth, sixth and seventh apertures 16*e-g*. Successive apertures in the first row of apertures 28 may, for example, alternate between positions that are offset above or below an axis arranged along the length of the first elongate member 20. Successive apertures in the second row of apertures 34 may, for example, alternate between positions that are offset to the left or to the right of an axis arranged along the length of the second elongate member 22.

As mentioned previously, this example is simplified to avoid obscuring the invention and it should be appreciated that, in other examples, each row of apertures may include any number of apertures, which may, for example, be determined based on: the length of the elongate members; and/or the spacing between adjacent apertures required to produce a desired angular resolution and/or field of view.

As the number of apertures increases, the aperture size increases and thus a smaller beamwidth can be achieved thus providing higher resolution, and collectively the row of apertures can transmit a combined beam of antenna signals across an appropriate field of view. In general, the configuration of the number of apertures, the size of each aperture and the spacing between adjacent apertures on each row of apertures depends on the desired antenna size and angular resolution while achieving minimum level of side-lobe.

For example, the plurality of antennas 38 may include twenty antennas in one example: the first row of apertures 28 may include eight apertures, each aperture having a length of 2 mm and being spaced from an adjacent aperture by 16 mm; and the second row of apertures 34 may include 12 apertures, each aperture having a length of 2 mm and being spaced from an adjacent aperture by 12 mm. In which case, the side-lobe power of the transmitted beam of antenna signals may be pushed into higher order side-lobes (that are outside of the field of view) when the first row of apertures 28 are connected to transmitting antennas and the second row of apertures 34 are connected to receiving antennas.

In FIGS. 2 and 3, the apertures 16*a-g* on each row of apertures 28, 34 are regularly spaced. Each aperture 16*a-g* is elongate and extends along the length of the respective elongate member 20, 22. Each aperture may, for example, have a length that is equal to half the wavelength of the radar signals transmitted therefrom or received thereat. Each aperture 16*a-g* may be spaced from an adjacent aperture by a distance equal to three or four times the wavelength of the radar signals transmitted therefrom or received thereat, for example.

Furthermore, each aperture 16*a-g* extends through the respective elongate member 20, 22 upon which it is arranged and each aperture 16*a-g* is configured to act as a transceiving point through which antenna signals may be transmitted and/or received.

This is made possible by the guide channel portion 46, which includes a plurality of distinct, uninterrupted guide channels 80, each of which is configured to guide antenna signals between one or more respective receiving positions 45 on the mount 44 and one or more respective apertures 16*a-g* extending through the array body 15. Each of the plurality of guide channels 80 may, for example, define a hollow pathway so as to minimise transmission losses.

Figure 4:
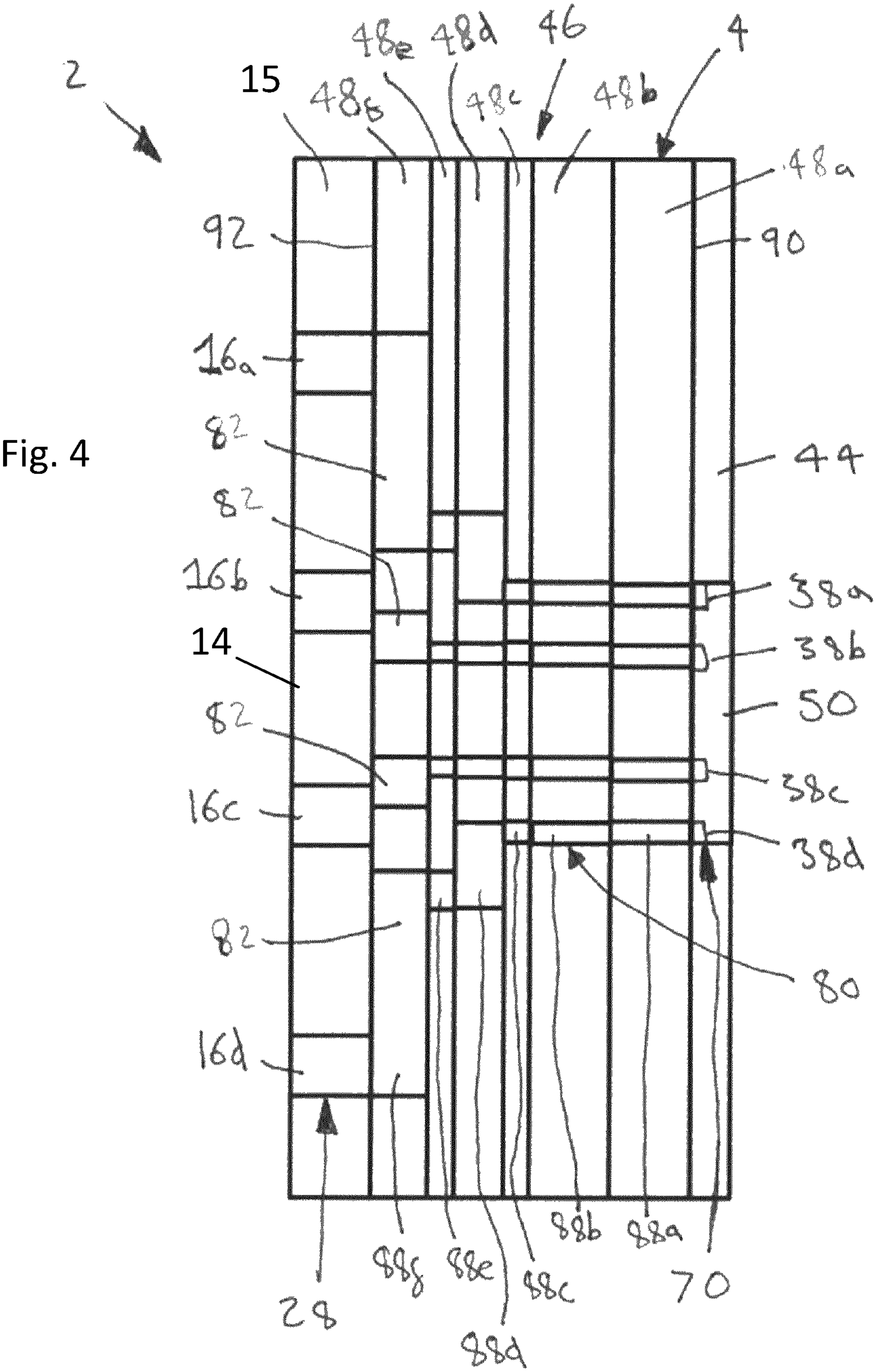
FIG. 4 shows a first cross-sectional view of the array antenna shown in FIG. 2.
Figure 5:
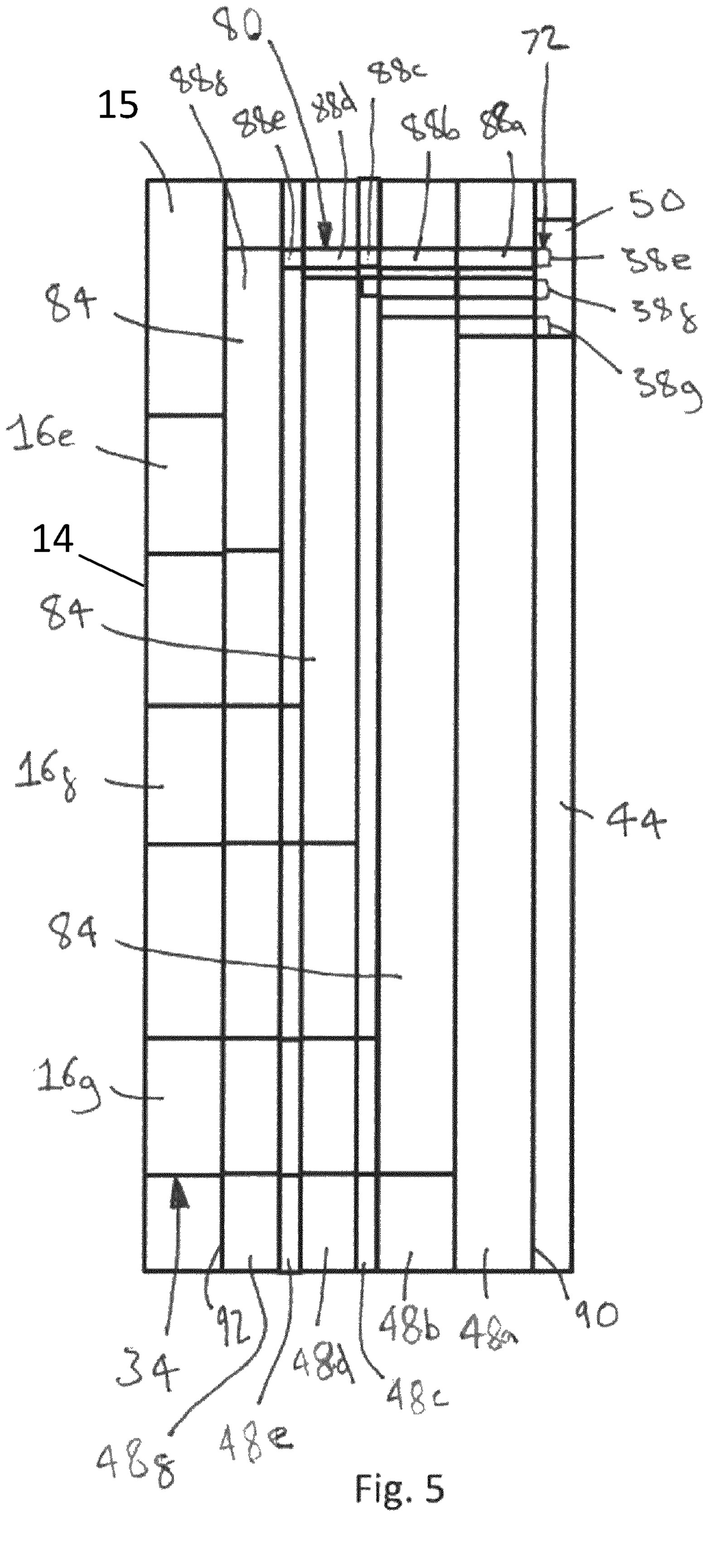
FIG. 5 shows a second cross-sectional view of the array antenna shown in FIG. 2.

FIGS. 4 and 5 show cross-sectional views through the array antenna 2 taken along lines A-A and B-B shown in FIG. 2 respectively. Once assembled, the single-chip radar 50 is mounted to the mount 44 of the wave guide 4 and the plurality of guide channels 80 align with the receiving positions 45 to connect each antenna 38 to a respective aperture 16 through the array body 15 of the wave guide 4.

In this example, the plurality of guide channels 80 includes a first set of guide channels 82, shown in FIG. 4, arranged to connect the first set of antennas 70 to the first row of apertures 28 on the array face 14 and a second set of guide channels 84, shown in FIG. 5, arranged to connect the second set of antennas 72 to the second row of apertures 34 on the array face 14. In particular, each of the guide channels 80 in the first set of guide channels 82 is configured to guide antenna signals between a particular antenna 38*a-d* selected from the first set of antennas 70 and a corresponding aperture 16*a-d* in the first row of apertures 28. Each of the guide channels 80 in the second set of guide channels 84 is configured to guide antenna signals between a particular antenna 38*e-g* selected from the second set of antennas 72 and a corresponding aperture 16*e-g* in the second row of apertures 34

The plurality of guide channels 80 may take any form suitable for conveying antenna signals between the plurality of antennas 38 on the mount 44 and the respective apertures 16 through the array body 15.

In this example, the guide channel portion 46 comprises first, second, third, fourth, fifth and sixth sub-layers 48*a-f*, or planar elements, that each feature a plurality of slots or openings 88*a-f* that join together to form the plurality of guide channels 80 when the sub-layers 48*a-f* are brought together.

Each of the plurality of openings 88*a-f* extends along and through a respective sublayer 48*a-f* to allow antenna signals to pass therethrough.

Each of the plurality of openings 88*a-f* on each sub-layer 48*a-f* aligns with and connects to a corresponding one of the plurality of openings 88*a-f* on an adjacent sublayer 48*a-f* to form an intercommunicating series of openings 88*a-f* through the sub-layers 48*a-f*. Accordingly, collectively the plurality of sub-layers 48*a-f* define a set of continuous openings through the guide channel portion 46, each continuous opening defining a respective guide channel 80. In particular, for each guide channel 80, a continuous opening is formed that extends through the first, second, third, fourth, fifth and sixth sub-layers 48*a-f* to guide antenna signals between one of the plurality of antennas 38 on the mount 44 and a corresponding aperture 16 through the array body 15. This may, for example, be considered analogous to the use of vias to connect different layers of a printed circuit board.

At a first end 90 of the guide channel portion 46 each guide channel 80 is aligned with a respective receiving point 45 on the mount 44 and, at an opposing second end 92 of the guide channel portion 46, each guide channel 80 is aligned with a corresponding aperture 16 that extends through the array body 15.

Although not shown in this example, the guide channels 80 may each have the same total length, i.e. the guide channels 80 may be configured such that antenna signals in each guide channel 80 travel the same distance between a particular aperture 16 in the array face 14 and a corresponding antenna 38 on the mount 44. Advantageously, thermal drift of phase relationships can be minimised when the plurality of guide channels 80 all have the same length.

To make this possible, one or more of the plurality of guide channels 80 may follow a winding route between the first and second ends 90, 92 of the guide channel portion 46. For example, one or more of the plurality of guide channels 80 may extend through the same sub-layer 48*a-f* multiple times or extend along a winding opening 88*a-f* on one or more sub-layers 48*a-f*.

Figure 6:
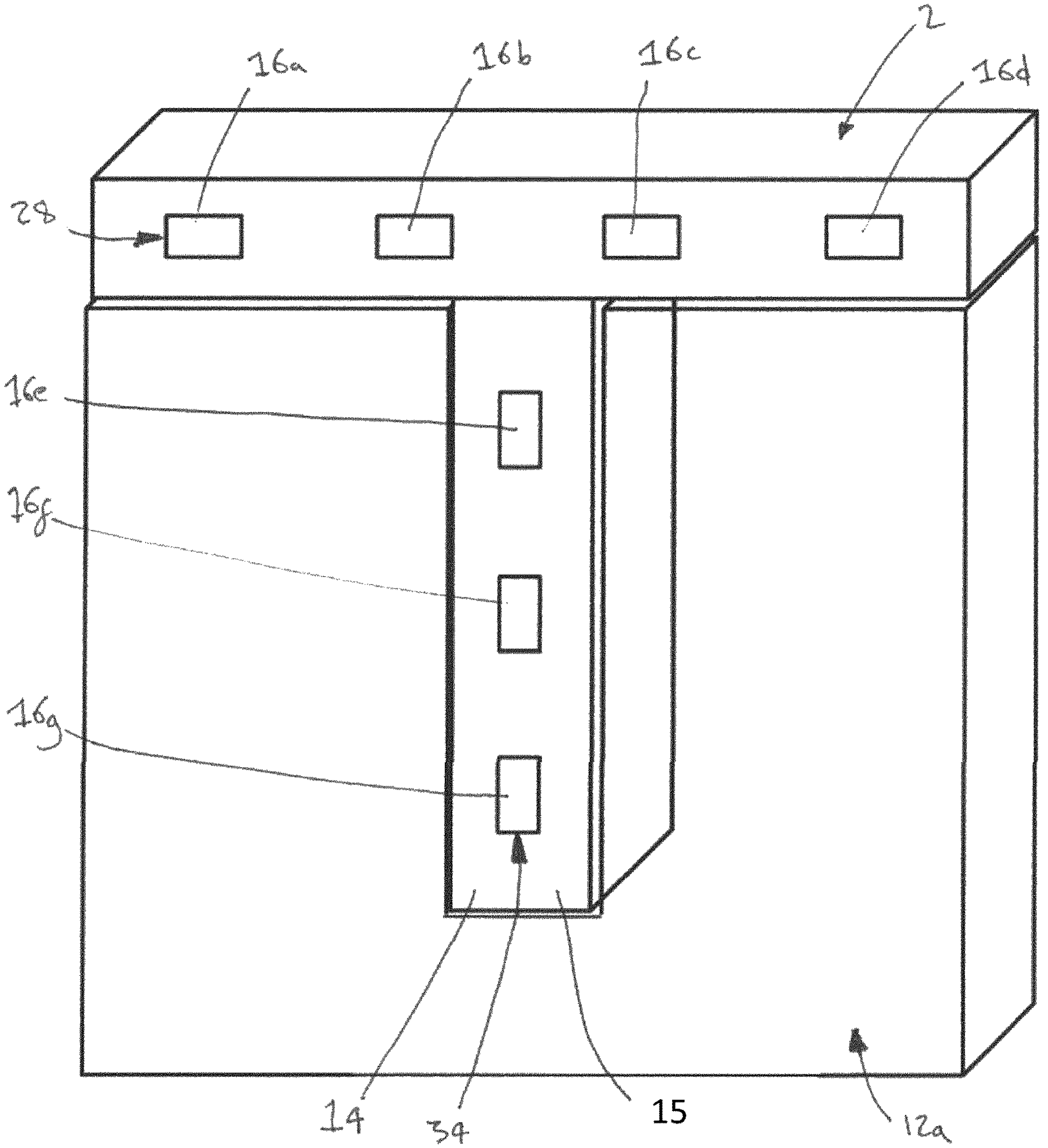
FIG. 6 shows a schematic representation of the array antenna shown in FIG. 2 in situ on the vehicle shown in FIG. 1.

FIG. 6 shows the array antenna 2 in-situ within the grille 12*a* of the vehicle 1. As shown, the array body 15 is configured to form a body panel of the vehicle 1, in use, with the array face 14 forming a visible surface on the exterior of the vehicle 1. Accordingly, in FIG. 6 the array antenna 2 is mounted to the grille 12*a* so that the array face 14 is flush or substantially flush with the surrounding surfaces of the grille 12*a*.

The wave guide 4 may include any suitable coupling means (not shown) for attachment to the vehicle 1. Such a coupling means may include any coupling element for fastening, joining, or otherwise adhering the wave guide 4 to the vehicle 1 so that relative movement between the array antenna 2 and the vehicle 1 is substantially inhibited. For example, the wave guide 4 may be bolted to the chassis of the vehicle 1 and fixed in position prior to fitting the grille 12*a* to the vehicle 1 to ensure the stability of the wave guide 4.

Once installed, the array antenna 2 may be operated to transmit and receive antenna signals to detect objects, such as other vehicles, ahead of the vehicle 1, as described in more detail below.

In particular, at any given moment in time (e.g. at time, T1), the control system 52 may operate the first set of antennas 70 as transmitters and the second set of antennas 72 as receivers. In this case, the first set of antennas 70 may be operated to transmit antenna signals simultaneously, producing multiple outputs e.g. as a phase modulated continuous waveform or a frequency modulated continuous waveform. Alternatively, signals may be transmitted sequentially, producing individual outputs. In either case, each of the antennas 38*e-g* in the second set of antennas 72 may be operated as receivers listening for the transmitted antenna signals, providing multiple inputs that may be processed using known forms of digital signal processing to provide object detection across the field of view. In this manner, the array antenna 2 can be operated using a multiple-input-multiple-output principle.

When antenna signals are transmitted from each antenna 38*a-d*, a beam of antenna signals is effectively transmitted in a horizontal plane from the apertures 16*a-d* on the first row of apertures 28 and the control system 52 may be configured to introduce phase delays to control the field of view and/or the angular resolution of the transmitted beam. In other words, the array antenna 2 can be operated as a phased array.

In particular, phase delays can be used to control the beam width and/or the direction of the antenna signals transmitted from each aperture 16*a-d* on the first row of apertures 28. Such phase delays can be used to steer the transmitted beam, vary the field of view and/or ensure that the transmitted beam has sufficient angular resolution to determine which lane of traffic a distant vehicle is driving in.

Transmitted antenna signals reflected off objects ahead of the vehicle 1 are subsequently received at the second row of apertures 34. The second set of guide channels 84 guide antenna signals received at each aperture 16*e-g* on the second row of apertures 34 to the second set of antennas 72. The second set of antennas 72 are able to process the received antenna signals, and decode the phase-modulated code sequence to determine the range, angle and velocity of the object that the antenna signal reflected off. In this manner, each antenna signal transmitted from each of the apertures 16*a-d* on the first row of apertures 28 can be received at any aperture 16*e-g* on the second row of apertures 34 and the received antenna signal can be processed by the control system 52 to determine which antenna 38*a-d* the antenna signal was transmitted from. This effectively produces a virtual array antenna with a 4×3 rectangular arrangement of antennas. In this way, the orthogonal rows of antennas emulate the performance of a rectangular array of the same height and width, but with a greatly reduced footprint.

At another time (e.g. T2), the control system 52 may switch the operation so that the second set of antennas 72 are operated as transmitters, thereby producing a beam of antenna signals in a vertical plane. Correspondingly, the first set of antennas 70 are operated as receivers in this situation.

It should be appreciated that the control system 52 is suitably configured to process and/or calibrate the transmission/receipt of the antenna signals, accounting for the fact that the antenna signals transmitted from, or received at, each antenna 16*a-g* travel a respective distance along a particular guide channel 80. The skilled person shall appreciate that such calibration methods are known in the art and are not discussed in more detail here to avoid obscuring the invention.

Advantageously, the array antenna 2 is therefore able to provide a useful angular resolution over a field of view that covers adjacent lanes of traffic, while imposing a minimal footprint on the exterior of the vehicle 1.

In other examples, the array antenna 2 may be mounted on the rear, sides, top or bottom of the vehicle 1. Furthermore, the array antenna 2 may be mounted to any other body component that is visible on the exterior of the vehicle 1 in use, i.e. any body component 12 that defines an exterior surface of the vehicle 1.

In another example, the wave guide 4 may include a housing having a base wall and a plurality of sidewalls that define an aperture for receiving the mount 44, the guide channel portion 46 and the array body 15. Such a housing may provide features for conveniently joining the first, second and third layers 47*a-c* together and retaining the first, second and third layers 47*a-c* in position.

In another example, the mount 44 may be inclined relative to the array face 14. For example, the mount 44 may be arranged perpendicularly to the array face 14 for attachment to a perpendicular surface of the vehicle 1. In this case, the guide channel portion 46 may turn through a right angle to connect the receiving positions 45 on the mount 44 to the apertures 16 through the array body 15. For example, the array antennas may transmit antenna signals upwards into the wave guide and the plurality of guide channels, between the mount and the array face, may turn through 90 degrees to transmit the antenna signals through respective apertures in a forward facing array face. In such a configuration, it may be easier to manufacture the guide channel portion such that the plurality of guide channels extend the same distance between a first end at the respective receiving position on the mount and a second end at the array face aperture.

Figure 7:
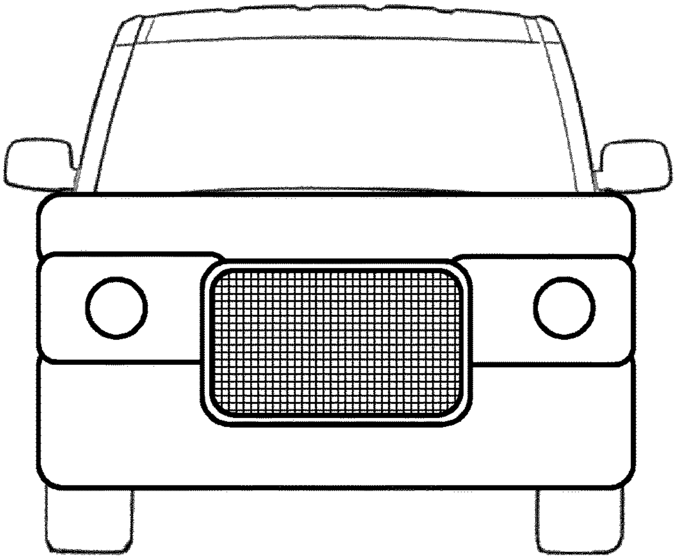
FIG. 7 shows a schematic representation of a vehicle including an array antenna in accordance with another embodiment of the present invention.
Figure 8:
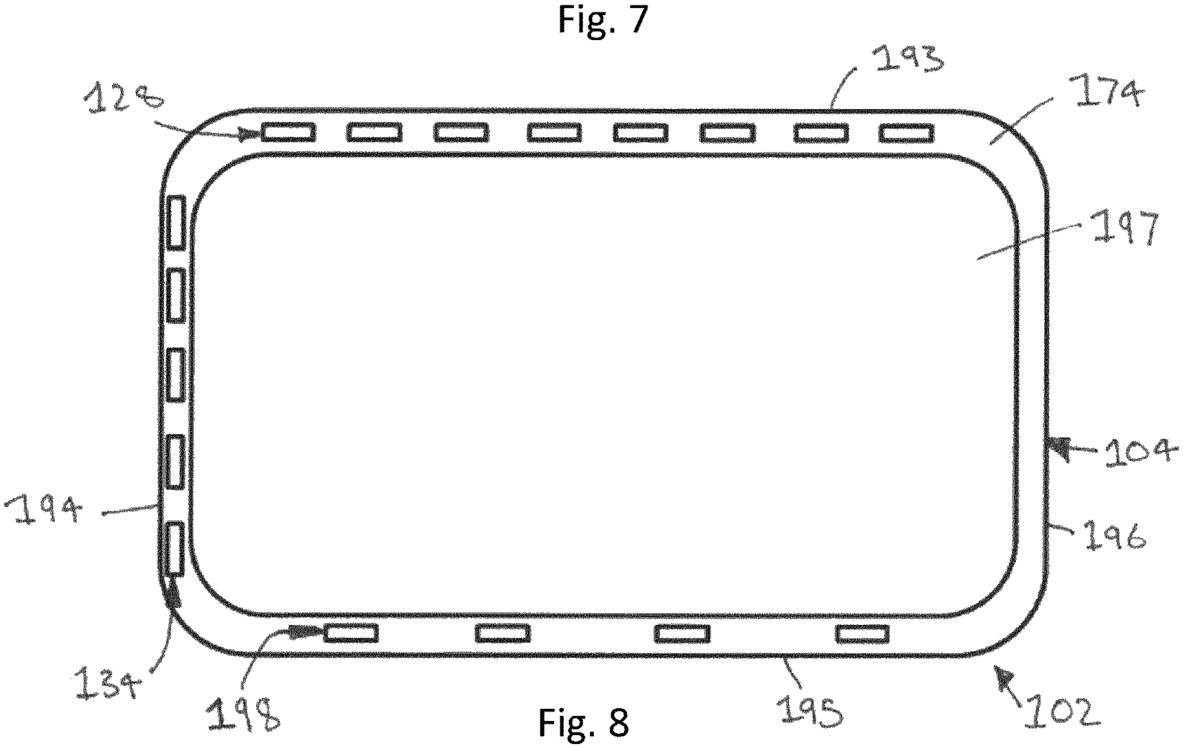
FIG. 8 shows a perspective view of a schematic representation of the array antenna shown in FIG. 7.

FIGS. 7 and 8 illustrate another example of an array antenna 102 in accordance with the invention. In this example, the array antenna 102 includes a wave guide 104 having a rectangular or box-shape, with the array body 115 being formed from a set of elongate members 118 that includes first, second, third and fourth elongate members 193, 194, 195, 196 arranged in a rectangle around a central cavity 197. The array face 114 on the array body 115 borders the grille 12*a* of the vehicle 1 in this example. The cavity 197 may have a minimum length of 10 cm between parallel elongate members 193, 194, 195, 196 so as to minimise the obstruction of the airflow to the grille 12*a*.

As shown in FIG. 8, in this example, the wave guide 104 includes a first row of apertures 128 arranged along the first elongate member 193, a second orthogonal row of apertures 134 arranged along the second elongate member 194 and a third row of apertures 198 arranged along the third elongate member 195. The fourth elongate member 196 may, for example, connect the first and third elongate members 193, 195 together to enhance the structural rigidity of the array body 115. The first and third rows of apertures 128, 198 are arranged in parallel to one another but, notably, the spacing between adjacent apertures on the first row of apertures 134 differs from the spacing between adjacent apertures on the third row of apertures 198.

In this example, the array antenna 102 also includes a first, a second and a third set of antennas (not shown) supported on a corresponding mount (not shown) and the wave guide 104 includes a first, a second a third set of guide channels (not shown), each set of guide channels connecting a respective set of antennas to a respective row of apertures 128, 134, 198.

In this example, at any given moment in time (e.g. T1), the control system 152 is configured to operate one of the first, second and third sets of antennas as transmitters to produce a beam of antenna signals from a respective row of apertures 128, 134, 198 and operates one of the first, second and third sets of antennas as receivers to detect the antenna signals.

At another moment in time (e.g. T2), a different set of antennas may be operated as receivers and/or a different set of antennas may be operated as transmitters to transmit a different shaped beam of antenna signals. This flexible operation can provide enhanced scanning resolution by making use of different combinations of the sets of antennas to transmit beams of antenna signals that have different fields of view, planes of view and/or angular resolution.

For purposes of this disclosure, it is to be understood that the controller(s) described herein can each comprise a control unit or computational device having one or more electronic processors. A vehicle and/or a system thereof may comprise a single control unit or electronic controller or alternatively different functions of the controller(s) may be embodied in, or hosted in, different control units or controllers. A set of instructions could be provided which, when executed, cause said controller(s) or control unit(s) to implement the control techniques described herein (including the described method(s)). The set of instructions may be embedded in one or more electronic processors, or alternatively, the set of instructions could be provided as software to be executed by one or more electronic processor(s). For example, a first controller may be implemented in software run on one or more electronic processors, and one or more other controllers may also be implemented in software run on one or more electronic processors, optionally the same one or more processors as the first controller. It will be appreciated, however, that other arrangements are also useful, and therefore, the present disclosure is not intended to be limited to any particular arrangement. In any event, the set of instructions described above may be embedded in a computer-readable storage medium (e.g., a non-transitory computer-readable storage medium) that may comprise any mechanism for storing information in a form readable by a machine or electronic processors/computational device, including, without limitation: a magnetic storage medium (e.g., floppy diskette); optical storage medium (e.g., CD-ROM); magneto optical storage medium; read only memory (ROM); random access memory (RAM); erasable programmable memory (e.g., EPROM and EEPROM); flash memory; or electrical or other types of medium for storing such information/instructions.

It will be appreciated that various changes and modifications can be made to the present invention without departing from the scope of the present application.

The invention claimed is:

1. A wave guide for an array antenna, the wave guide comprising:

a mounting portion configured to receive a plurality of radar antennas of the array antenna, the mounting portion comprising a respective receiving position for each radar antenna of the array antenna;

a set of elongate members spaced from the mounting portion, each elongate member including a series of apertures arranged along the elongate member, wherein each elongate member extends orthogonally to an adjacent elongate member of the set; and a plurality of guide channels, each guide channel extending between a respective one or more receiving positions of the mounting portion and a respective one or more apertures of the elongate members to connect, in use, one or more of the plurality of radar antennas to one or more of the apertures.

2. The wave guide according to claim 1, wherein at least some of the elongate members of the set of elongate members are integral with one another.

3. The wave guide according to claim 1, wherein the set of elongate members form an array body having an array face.

4. The wave guide according to claim 3, wherein the array face is planar.

5. The wave guide according to claim 3, wherein the set of elongate members includes a parallel pair of elongate members spaced apart from one another so that the array face includes a cavity between the parallel pair of elongate members.

6. The wave guide according to claim 5, wherein the cavity spans a length of at least 10 cm.

7. The wave guide according to claim 3, wherein the set of elongate members are arranged on a first plane and the wave guide has a length extending from the first plane to a second plane in which the mounting portion is arranged; and wherein the wave guide defines a continuous section along the length of the wave guide between the first plane and the second plane, a profile of the continuous section being defined by the array face.

8. The wave guide according to claim 3, wherein respective surfaces of the elongate members in which the apertures are arranged collectively define the array face.

9. The wave guide according to claim 1, wherein the wave guide includes a plurality of layers, wherein the mounting portion forms a first layer of the wave guide, the set of elongate elements form a second layer of the wave guide and the plurality of guide channels form a third layer of the wave guide, the third layer being arranged between the first layer and the second layer.

10. The wave guide according to claim 9, wherein the third layer comprises a plurality of sub-layers that join together to form the plurality of guide channels, wherein each guide channel includes a respective opening in each of the plurality of sub-layers and each guide channel is formed by a collective series of the respective openings that extends through the plurality of sub-layers.

11. The wave guide according to claim 1, wherein each of the plurality of guide channels extends through a same length between said respective receiving position and said respective aperture.

12. An array antenna for a vehicle, the array antenna comprising: the wave guide of claim 1; and the plurality of radar antennas; wherein the plurality of radar antennas are received on the mounting portion of the wave guide such that each radar antenna is received in a respective receiving position on the mounting portion of the wave guide.

13. The array antenna according to claim 12, wherein:

the plurality of guide channels includes a first set of guide channels and a second set of guide channels;

the plurality of radar antennas includes a first set of antennas and a second set of antennas;

each guide channel in the first set of guide channels connects one or more antennas from the first set of antennas to one or more apertures of a first elongate member of the set of elongate members;

each guide channel in the second set of guide channels connects one or more antennas from the second set of antennas to one or more apertures of a second elongate member of the set of elongate members; and the first elongate member is orthogonal to the second elongate member.

14. The array antenna according to claim 13, including a control system comprising one or more controllers, the control system being configured to operate the plurality of radar antennas as at least one of the following: a phased array antenna; and a virtual array of radar antennas.

15. The array antenna according to claim 14, wherein the first set of antennas includes a first set of transceivers and the second set of antennas includes a second set of transceivers, and the control system is configured to operate one of the first and second sets of antennas as transmitters and the other of the first and second sets of antennas as receivers at any given moment.

16. The array antenna according to claim 14, wherein the control system is configured to operate the plurality of radar antennas to produce at least one of: a phase-modulated continuous waveform; and/or a frequency-modulated continuous waveform.

17. The array antenna according to claim 12, including a single-chip radar sensor comprising the plurality of radar antennas.

18. A vehicle comprising the wave guide of claim 1.

19. The vehicle according to claim 18, wherein the wave guide is attached to the vehicle and the set of elongate elements of the wave guide border a body component of the vehicle.

20. A vehicle comprising the array antenna of claim 12.

* * * * *